J. A. Burgess,

Grapple.

No. 107,444.  Patented Sep. 20, 1870.

Witnesses.  Inventor.
Gustave Dieterich  J. A. Burgess
           per
           Munn & Co.
           Attorneys.

United States Patent Office.

JOHN A. BURGESS, OF PLYMOUTH, MASSACHUSETTS, ASSIGNOR TO HIMSELF AND JOSHUA STANDISH, OF SAME PLACE.

Letters Patent No. 107,444, dated September 20, 1870.

IMPROVEMENT IN HOISTING-GRAPPLES.

The Schedule referred to in these Letters Patent and making part of the same.

To all whom it may concern:

Be it known that I, JOHN A. BURGESS, of Plymouth, in the county of Plymouth and State of Massachusetts, have invented a new and useful Improvement in Hoisting-Grapple; and I do hereby declare that the following is a full, clear, and exact description thereof, which will enable others skilled in the art to make and use the same, reference being had to the accompanying drawing forming part of this specification.

The object of this invention is to facilitate the operation of hoisting barrels, containing fish or other material or substance, having but one head, designed more especially for use in fishing vessels for hoisting and lowering fish (which are usually packed in open barrels) into the holds of the vessel; and It consists in a bail, to the eyes of which are loosely attached two semicircular grappling-jaws, which are made to span the barrel, so that the barrel may be hoisted thereby, as hereinafter more fully described.

In the accompanying drawing—

Similar letters of reference indicate corresponding parts.

Figure 1:
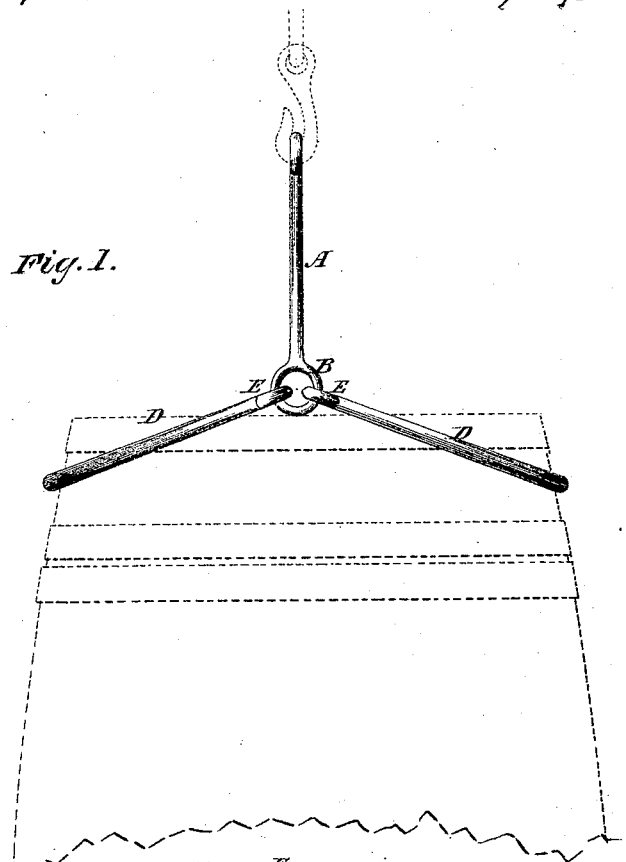
Figure 1 represents the grapple, as when in use, or attached to a barrel, the latter being seen in dotted lines.
Figure 2:
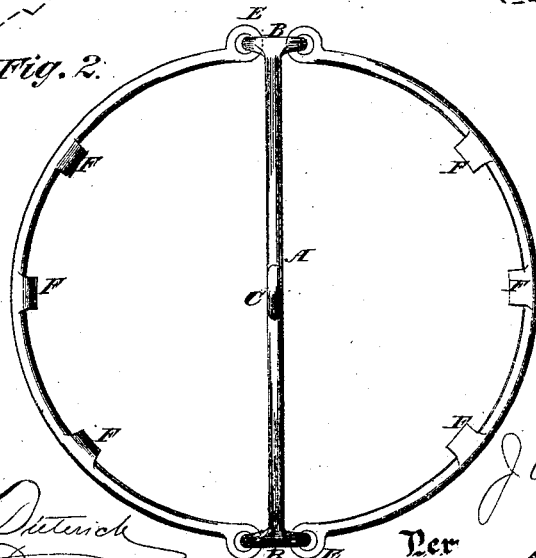
Figure 2 is a top view of the grapple.

A is the bail, which has an eye, B, at each end, and a central eye, C, to which the hoisting-hook is attached, as seen in fig. 1.

D D are the grappling-jaws, which are semicircular in form, the ends of which are attached, by eyes E, to the eyes C of the bail, so that the grapples D D hang loosely on the bail.

Each of the grapples D D are provided with one or more teeth, F, which, when the grapple is applied to a barrel, as seen in fig. 1, penetrate the wood of the barrel as the weight is brought upon them in lifting. This prevents the grapples from slipping off the barrel. The adhesion thus caused is sufficient to raise any desired weight.

For hoisting barrels with but a single head, this grapple is invaluable, especially on board of fishing vessels.

Having thus described my invention,

I claim as new and desire to secure by Letters Patent—

The bail A, and the grappling-jaws D D, constructed and arranged to operate in combination, substantially as and for the purposes described.

JOHN A. BURGESS.

Witnesses:
 DANIEL E. DAMON,
 CHARLES MAY.